US007342923B2

(12) United States Patent
Botvich (10) Patent No.: US 7,342,923 B2
(45) Date of Patent: Mar. 11, 2008

(54) METHOD AND SYSTEM FOR BANDWIDTH ESTIMATION

(75) Inventor: Dmitri Botvich, Dublin (IE)

(73) Assignee: Corvil Limited, Dublin (IE)

( * ) Notice: Subject to any disclaimer, the term of this patent is extended or adjusted under 35 U.S.C. 154(b) by 898 days.

(21) Appl. No.: 10/650,032

(22) Filed: Aug. 28, 2003

(65) Prior Publication Data

US 2005/0100009 A1  May 12, 2005

Related U.S. Application Data

(63) Continuation-in-part of application No. PCT/IE01/00030, filed on Feb. 28, 2001.

(51) Int. Cl.
*H04L 12/26* (2006.01)
*H04J 1/16* (2006.01)
*G08C 15/00* (2006.01)
*G06F 11/00* (2006.01)

(52) U.S. Cl. .................. 370/389; 370/232; 370/468; 709/223

(58) Field of Classification Search ........ 370/229–238, 370/248–252, 389–395, 412–468; 709/223–239
See application file for complete search history.

(56) References Cited

U.S. PATENT DOCUMENTS

| | | | | |
|---|---|---|---|---|
| 5,812,526 A | * | 9/1998 | Chang et al. | 370/230 |
| 6,028,840 A | * | 2/2000 | Worster | 370/230 |
| 6,041,039 A | * | 3/2000 | Kilkki et al. | 370/230 |
| 6,046,981 A | * | 4/2000 | Ramamurthy et al. | 370/232 |
| 6,081,505 A | * | 6/2000 | Kilkki | 370/230 |
| 6,385,172 B1 | * | 5/2002 | Kataria et al. | 370/238 |
| 6,580,691 B1 | | 6/2003 | Bjoerkman et al. | 370/232 |
| 6,683,852 B2 | * | 1/2004 | Nagarajan et al. | 370/235 |
| 7,096,260 B1 | * | 8/2006 | Zavalkovsky et al. | 709/223 |
| 2004/0037231 A1 | * | 2/2004 | Heiner et al. | 370/252 |
| 2004/0042400 A1 | * | 3/2004 | Horlin et al. | 370/232 |
| 2005/0163103 A1 | * | 7/2005 | Malomsoky et al. | 370/352 |
| 2005/0226249 A1 | * | 10/2005 | Moore | 370/395.21 |

FOREIGN PATENT DOCUMENTS

WO    WO98/37708    8/1998

OTHER PUBLICATIONS

Duffield et al, IEEE Jour on Selected Areas in Commun, vol. 13, No. 6, pp. 981-990, Aug. 1995, Entropy of ATM Traffic Streams . . . .

(Continued)

*Primary Examiner*—M. Phan
(74) *Attorney, Agent, or Firm*—Schwabe, Williamson & Wyat, P.C.

(57) ABSTRACT

The invention relates to a system and method for estimating the effective bandwidth on-line at a node in a communications network. The invention works by measuring the effective bandwidth and the mean rate of traffic flow for an identified type of traffic flow off-line, defining a relationship between the two measured values and storing the relationship in a database of relationships for different identifiable types of traffic flow off-line. A type of traffic flow or group of flows is identified on-line from which the mean rate of traffic flow is measured on-line which is a relatively simple measurement to make. From the database of relationships a relationship is obtained from which the effective bandwidth is estimated for the traffic flow or flows on-line.

51 Claims, 2 Drawing Sheets

OTHER PUBLICATIONS

Kelly, Queueing Systems 9, pp. 5-16, 1991, Effective bandwidths at multi-class queues.

Botvich et al, pp. 1-23, 1995, Large deviations, the shape of the loss curve, and economies of scale in large multiplexers.

Courcoubetis et al, ITC 14, Jun. 1994, pp. 201-212, On the Performance of an Effective Bandwidths Formula, XP000593411.

Fan et al, ICICS '97, pp. 345-350, Sep. 1997, An NN-Based Dynamic Time-Slice Scheme for Bandwidth Allocation in ATM . . . .

Ogier et al, Proc of IEEE Infocom 1996, pp. 768-776, Mar. 1996, Neural network methods with traffic descriptor compression . . . .

* cited by examiner

METHOD AND SYSTEM FOR BANDWIDTH ESTIMATION

This is a continuation-in-part of PCT/1E01/00030 filed Feb. 28, 2001 and published in English.

FIELD OF THE INVENTION

The present invention relates to a method and system for estimating the effective bandwidth requirement on-line at a node in a communications network.

The rate in bits per second at which a buffer is served is often referred to as the bandwidth. Other terms often used interchangeably are "service capacity" or "link rate". A communication network is a collection of network elements interconnected so as to support the transfer of information from a user at one network node to a user at another network node. The principal network elements are links and switches. A link transfers a stream of bits from one end to another at a specified rate with a given bit error rate and a fixed propagation time. Several incoming and outgoing links meet at a switch, a device that transfers bits from its incoming links to its outgoing links. The term "switch" is used in telephony, while in computer communications, the device that performs routing is called a router, and the terms are used interchangeably in this specification. The term "node" is thus used to include both a switch and a router.

BACKGROUND OF THE INVENTION

Due to the recent explosion of Internet use, there has been an enormous increase in data or traffic flow being sent over communication networks. This has led to a huge increase in bandwidth requirements by operators which is expensive. A problem with handling traffic flow is that it is difficult to estimate due to the "bursty" nature of traffic flows. For example, if someone decides to send video data to another source over a communications network, it uses a lot of bandwidth. A solution to this problem is that when network operators are allocating bandwidth to a node or a router, a large amount of bandwidth is allocated to that node to handle any of the bursty traffic. This is very wasteful of bandwidth.

Various methods and systems have been employed to control the admission of traffic flows in packet switch networks such as Internet Protocol (IP) based networks which includes traditional IP, IntServ, DiffServ and MPLS networks as well as ATM and Frame Relay. It is important to have a reliable estimation of resources required to meet quality of service performance requirements. The estimation of resources can be based on the usage of measurement and estimation of effective bandwidth. At present it is impractical to estimate the required resource for each traffic flow separately on-line for a number of reasons, including scalability, as well as the fact that many traffic flows exist only for a short period of time, especially in IP based networks. It is more practical to estimate effective bandwidth for traffic aggregates comprising many flows.

The effective bandwidth of a variable bit rate traffic flow is a measure that summarises statistical properties of the traffic flow into just one value, while taking into account the quality of service requirements such as cell loss ratio, delay, and other parameters. Also, the bandwidth estimation of the effective bandwidth can take into account some other parameters such as link, bandwidth, buffer size, etc.

Loss and delay of data packets at a node in the network arise from the queuing of packets in the buffers of switches or routers. Buffers are required to cope with fluctuations in the bit-rate on incoming links. However, if the buffers are too small, packets will be lost as a result of buffer overflow; if the buffers are too large, some packets will experience unacceptable delays. For a given buffer-size, loss and delay can be reduced by increasing the capacity of the outgoing link.

To eliminate packet loss entirely, it would be necessary to increase the capacity of the outgoing link to equal the sum of the capacities of the incoming links. This is prohibitively expensive. Nevertheless, it is a strategy employed sometimes by network operators who take a conservative view on assuring network quality of service.

There is a better way. It is unnecessary to eliminate packet loss and unacceptable packet delay in order to give satisfactory perceived quality. It is enough to keep their frequency within predetermined bounds. These bounds are referred to as Quality of Service (QoS) targets.

The optimal way to ensure satisfactory perceived quality is to provide the minimum capacity that will guarantee the QoS targets. This minimum capacity is referred to as the Bandwidth Requirement (BWR) of the bit-stream. It lies somewhere between mean rate and the peak-rate requirement.

The existence of a BWR and its value can be demonstrated experimentally with a router by observing the change in the frequency with which a target queuing delay in an output buffer is exceeded when the capacity of the outgoing link is varied.

The mean-rate and the peak-rate doe not depend on the QoS targets. For bursty traffic, the peak-rate can be many multiples of the mean-rate. As the QoS target changes, the BWR varies between them.

For a given QoS target, the BWR depends strongly on the nature of the traffic. There is no universal multiplier than can be applied to the mean-rate or peak-rate to give the BWR for a given QoS target.

This opens the way for many applications: monitoring network quality levels, QoS-sensitive service provisioning, IP call admission control, traffic-based billing and capacity planning.

Prior Art disclosed, for example in Duffield, Lewis et al. [IEEE Journal for Selected Areas in Communications, August 1995] shows that the relevant statistical data required for the determination of BWR can be encapsulated in a single function, namely, the Scaled Cumulant Generating Function [sCGF]. An invention disclosed in U.S. Pat. No. 6,580,691 (Bjoerkman et al), discloses a method and system for estimating the sCGF on-line in real time and storing it as a compact traffic descriptor. This publication relates to inelastic traffic which estimates the bandwidth requirement for a traffic flow on-line.

Essentially, therefore, given the buffer size b and the QoS target Q, the BWR of a node in the communications system can be calculated from the traffic descriptor D. It will be appreciated that the traffic descriptor, which is essentially the statistical properties of the data, is all important. That descriptor must contain sufficient relative and statistical information to allow computation of the bandwidth requirement. Essentially, the traffic descriptor D describes the characteristics of the particular traffic.

On-line implementation of the estimation of the effective bandwidth is complicated due to a number of reasons, such as performance related constraints, measurements and estimation, technique constraints, router constraints and measurement point constraints. The affect of all these factors is that on-line estimation of effective bandwidth at a node has not been achieved accurately.

The estimation of the effective bandwidth of a traffic flow consumes router resources. Therefore, it is impractical to estimate the effective bandwidth for each traffic flow when the number of flows becomes too large. Such a straight forward approach leads to a scalability problem as the number of flows increase. Some models used in the estimation of the effective bandwidth rely on parameters that are either difficult to measure effectively or reliably. An example of such a parameter is the peak rate of flow. The peak rate of flow is very sensitive to local fluctuations of traffic flow. It's estimation is often based on averaging over a small period of time and it is either over estimated or under estimated. It has been found that the declaration of peak rate is not accurate thus it does not provide a full remedy to the problem.

Router constraints is a problem because the buffer counters within the router provide raw information for estimation of effective bandwidth only. Some routers provide access to counters at output buffers but for bandwidth estimation purposes, it is not an accurate estimation. This is also applicable to other types of network elements including switches or bridges.

The mean rate of traffic flow is a good characteristic for bandwidth estimation. Mean rate is a very robust characteristic of traffic flow. In particular, it is not practically sensitive to local short term fluctuations in flow rate. Mean rate is relatively simple to measure. For this reason, it is very desirable to use the mean rate as the basis for estimation of effective bandwidth. Unfortunately, in general the mean rate of the source does not reflect a network resource required for a flow to meet quality of service requirements. It has also been found that the direct usage of mean rate, together, for example, with the peak rate for the estimation of the effective bandwidth can lead to inaccurate results. A principal drawback of such a method or system, as already mentioned, is that the peak rate is very sensitive to local fluctuations of traffic and is difficult to measure.

In the paper F. P. Kelly "Effective Bandwidths at Multi-class Queues", Queuing Systems 9, 1991, pp 5-16" a method for the estimation of the effective bandwidth of an individual flow is proposed. In principle this method can be used for the off-line estimation of the effective bandwidth required. For on-line usage however it is too time consuming. The other disadvantage of this method is that it does not take into account buffer size and as a consequence of this it does not deal with any delays. The paper does not propose a method for estimating effective bandwidth on-line accurately.

In another paper D. D. Botvich & N. G. Duffield "Large Deviations, Economies of Scale, and the Shape of the Loss Curve in Large Multiplexers" Queuing Systems 20, 293-320 (1995) investigates the behaviour of the effective bandwidth in the situation when the number of traffic sources is increased. The economy of scale in this case is evaluated and estimated for properly chosen scaling. This paper provides a theoretical basis for estimating the effective bandwidth for a number of flows off-line.

PCT Patent Application No. PCT/IE98/00013 "Telia Research AB et al" discloses a general method for the estimation of the effective bandwidth applicable both to individual flows and traffic aggregates. This method is flexible and accurate for the estimation of effective bandwidth for individual flows. This method can be used both off-line and on-line. The on-line implementation however has some limitations due to the fact that most of today's routers and switches are not able to provide sufficiently accurate "raw" measurement data. Thus, the on-line estimation of effective bandwidth is invariably inaccurate for a large number of flows.

In this specification, the term "traffic flow" is used interchangeably with other terms including "call" and "connection". It will be appreciated to someone skilled in the art that the term "traffic flow" is used in IP based networks, while the terms "call" and "connection" are used in ATM networks. For this reason we also use terms "packet" and "cell" interchangeably. Further, in this specification, we use the terms "measurement" and "estimation" in a different way. We refer to measurement as the process of collecting the raw traffic information. The estimation process uses the data collected from the measurement process.

The terminology of this specification is generally that which is used in High-Performance Communication Networks [Jean Walrand and Pravin Varaiya (Second Edition) Academic Press 2000], unless clearly otherwise.

OBJECTS OF THE INVENTION

An object of the present invention is to provide a method for estimating the effective bandwidth requirement at a node in a communications network. This must be done in such a way as to be quickly and easily calculated, without too much router or switch capacity being used.

A further object is to ensure that the estimation of bandwidth requirement is quality of service sensitive. Further, any such estimation of bandwidth requirement must deal with loss and delay parameters in real time.

It is a further object of the present invention that when providing an estimate of bandwidth requirement at a switch or router, namely, a node in a communications circuit, it can be done in such a way as to allow for admission control.

A further object of the present invention is to provide a solution to the problems suggested above and to provide a bandwidth requirement estimation technique in real time that relies on robust and easily measurable parameters in the network.

SUMMARY OF THE INVENTION

The present invention relates to a method of estimating the effective bandwidth requirement of a traffic flow at a node in a communications network. This effective bandwidth is the service capacity or link rate at the node which will be a switch or a router.

There is provided an associated database of relationships, the database will have been provided previously by measurements which will identify a type of traffic flow off-line, namely, whether it is voiceover IP, video, and so on. Then, off-line will be estimated a mean rate of traffic flow of the identified type of traffic flow. This will be done by taking a sample. Then, the effective bandwidth requirement of this flow is estimated. Then, a relationship between the effective bandwidth and the mean rate of traffic flow for this identified type of traffic flow is obtained. This is then stored in the database of relationships so that now in the database of relationships, there is an identified traffic flow, that identified traffic flow has a mean flow rate ascribed to it, it has a bandwidth requirement and it has a relationship between the bandwidth requirement and the mean rate of traffic flow. In its simplest, this will be the ratio between the two, namely, a multiplier of the mean rate of traffic flow.

Then, the method of the invention comprises sampling a type of traffic on-line at a particular node. Then, from the sample, the mean rate of the traffic flow of this particular traffic is identified. This is then compared with a similar identified type of traffic flow off-line in the database of relationships so that we now have a particular identified flow of traffic for that particular flow of traffic. Then, using the relationship from the database, it is possible to calculate and estimate easily the effective bandwidth requirement of the traffic flow on-line at the node, from the estimated mean rate of that traffic flow on-line and the relationship obtained from the database of relationships.

It will be appreciated that generally the traffic reaching a node will consist of a number of individual traffic flows. Thus, the invention includes measuring the mean rate of traffic flow individually on-line from a number of identified types of traffic flows forming a traffic aggregate. Then, each type of identified traffic flow on-line is compared to a similar type of traffic flow off-line, that is to say, in the database, to obtain a relationship from the database of relationships for each type of identified traffic flow on-line which makes up this aggregate traffic flow on-line. Then, the effective bandwidth on-line at the node for the number of identified types of traffic flow is obtained to give an estimated bandwidth requirement for the traffic aggregate.

In another way of carrying out the invention, the traffic aggregate itself is identified and then these are compared with an identified traffic flow off-line in the database, which database contains a mean flow rate and an estimated bandwidth requirement for a similar traffic flow aggregate.

Thus, the traffic flow can be a traffic flow aggregate, namely, an aggregate of a group of traffic flows and then effectively, the traffic flow aggregate or traffic aggregate is dealt with as if it were one cohesive traffic flow.

It is envisaged that the database of relationships will be updated from time to time with the estimated effective bandwidth requirement and the estimated mean flow rate of the on-line traffic which had been sampled. Needless to say, it will be appreciated that obtaining the effective bandwidth requirement takes account of quality of service (QoS) requirements in the communications network, as well as, for example, a loss ratio and/or a delay parameter in the communications network.

Ideally, the calculation of the relationship between the effective bandwidth requirement and the mean flow rate of traffic flow is calculated off-line over a number of time intervals.

One method of estimating the effective bandwidth off-line and estimating the mean rate off-line of a sample of the traffic for a number of traffic flows to obtain a relationship represented by:

$$C_i = \frac{E_i}{m_i} \qquad i = 1 \ldots N$$

and in which $$C = (T_i C_i + \ldots + T_N C_N)/(T_i + \ldots + T_N)$$

where
  $C_i$=ratio for the i-th flow,
  $E_i$=Effective bandwidth requirement the for i-th flow measured off-line,
  $m_i$=Mean rate of traffic flow for the i-th flow measured off-line,
  N=Number of different traffic flows,
  $T_i$=time duration of a particular flow, and
  N=total number of flows.

A still further method comprises estimating the effective bandwidth requirement off-line and estimating the mean rate off-line of a sample of the traffic for a number of traffic flows to obtain a relationship represented by:

$$C_i = \frac{E_i}{m_i} \qquad i = 1 \ldots N$$

and in which $$C = (T_i E_i + \ldots + T_N E_N)/(T_i m_i + \ldots + T_N m_N).$$

where
  $C_i$=ratio for the i-th flow,
  $E_i$=Effective bandwidth requirement the for i-th flow measured off-line,
  $m_i$=Mean rate of traffic flow for the i-th flow measured off-line,
  N=Number of different traffic flows,
  $T_i$=time duration of a traffic flow,
  $E_i$=estimated effective bandwidth requirement of a traffic flow,
  $m_i$=measured mean rate of a traffic flow, and
  C=ratio for N traffic flows.

Ideally, in estimating the effective bandwidth, the step is performed of:
  factoring the quality of service requirements into the estimation of bandwidth requirement by calculating the maximum number of flows to maintain quality of service requirements by:

$$\text{Prob}\{mC_1 + \ldots + mC_N > B\} < P$$

wherein
    m=measured mean rate of traffic flow,
    C=typical ratio for one traffic flow,
    B=bandwidth requirement to maintain quality of service,
    P=loss ratio, and
    N=Number of traffic flows.

In another method of estimating the effective bandwidth, the steps are performed of:
  factoring the quality of service requirements into the estimation of bandwidth requirement by calculating the maximum number of flows to maintain quality of service requirements by:

$$\text{Prob}\{mC_1 + \ldots + mC_N > B\} < P$$

wherein
    m=measured mean rate of traffic flow
    C=typical ratio for one traffic flow
    B=bandwidth requirement to maintain quality of service
    P=loss ratio
    N=Number of traffic flows
  and in which the effective bandwidth requirement is obtained by estimating a ratio D off-line for a number of traffic flows represented by:

$$D = \frac{B}{mn}$$

where
    B=bandwidth requirement to maintain quality of service
    m=mean rate
    n=maximum number of flows allowed at the node.

In another way of carrying out the invention, the invention is carried out not on one specific traffic flow, but on an aggregate of traffic flows, that is to say, traffic comprising a plurality of individual traffic flows. Then, the invention is carried out as if the aggregate flow was, of itself, one singular flow.

In another embodiment of the invention, all of the steps, including the preparation of the database, are carried out.

It will be appreciated that in the present invention, some of the steps of carrying out the invention may be carried out outside the jurisdiction. For example, the switch or router, that is to say, the node, could be within the jurisdiction and the sample could be taken within the jurisdiction and the results of the sample sent outside the jurisdiction for further processing and then the results, namely, the estimated bandwidth requirement at the node, would be delivered back to the node where it could be used to control the operation of the switch or router forming the node.

Alternatively, the node could be outside the jurisdiction and the data could be received from the node to be processed within the jurisdiction and then again, the results of the processing could be optionally sent outside the jurisdiction to the node.

The invention also provides a system for estimating the effective bandwidth requirement at a node in a communications network. This would normally consist of at least one computer or other computer hardware connected to the node or at least into the communications system whereby it could be connected to the node.

The system would have a database of relationships comprising, for a previously sampled traffic flow, an identifier for the traffic flow, an estimate of the mean rate of flow of said identified traffic flow and an estimated effective bandwidth requirement for the said identified traffic flow, together with a measure of the relationship with the mean rate of flow and the effective bandwidth requirement. It is important to appreciate that this identifier is not the same as the traffic descriptor used to calculate the effective bandwidth requirement.

The system will also include means for sampling traffic on-line at the node and means for allocating an identifier to the traffic on-line at the node. Further, having sampled the traffic, it is possible, from the sample, to estimate the mean rate of flow of the traffic on-line. It should be noted that using the term "traffic on-line" here, is more to refer to the particular type of traffic, that is, the traffic that is actually being sampled for control, rather than simply whether the traffic itself is, at this stage, off-line or on-line. The traffic will have remained on-line but the sample will actually be off-line. It would be totally confusing to refer to it as "a traffic being sampled on-line, now being off-line".

There is also provided means for comparing the identifier of the traffic on-line with the identifiers in the database, so that you have a means for identifying the closest stored identifier on the database with that of the traffic on-line. Then, there is means for extracting the appropriate relationship from the database and estimating the effective bandwidth requirement of the traffic flow on-line.

Ideally, the system includes means for dividing the traffic flows into a number of separate traffic flows and for handling each separate traffic flow independently to provide an effective bandwidth requirement for each separate traffic flow. This can be very important for control purposes.

Further, the system will include admission control means whereby some of the separate traffic flows making up the traffic flow on-line at the node may be rejected if the estimated bandwidth requirement at the node exceeds the bandwidth requirement available at the node for the traffic.

Further, the system comprises means to measure the mean rate of traffic flow individually on-line for a number of identifiable types of traffic flows forming a traffic aggregate.

Ideally, the system comprises means to estimate the effective bandwidth requirement on-line at the node for a number of identifiable types of traffic flow.

The system includes means for updating the database of relationships with a relationship from the estimated effective bandwidth requirement and the estimated mean rate on-line value for future reference.

It is envisaged that the invention will be carried out by various computers which will be programmed with program instructions so as to cause them to carry out the methods according to the invention or to provide the means of the system. Such computer programs can be one of a recordable medium, embodied on a computer memory, embodied in a read-only memory, carried on an electrical signal carrier or on an optical signal carrier. These can then be loaded on a computer to comprise some or all of the means of the system or indeed to carry out some of the methods.

BRIEF DESCRIPTION OF THE DRAWINGS

The present invention will be more clearly understood from the following description of some embodiments thereof, given by way of example only, with reference to the accompanying drawings, in which.

DETAILED DESCRIPTION OF THE PREFERRED EMBODIMENTS

Figure 1:
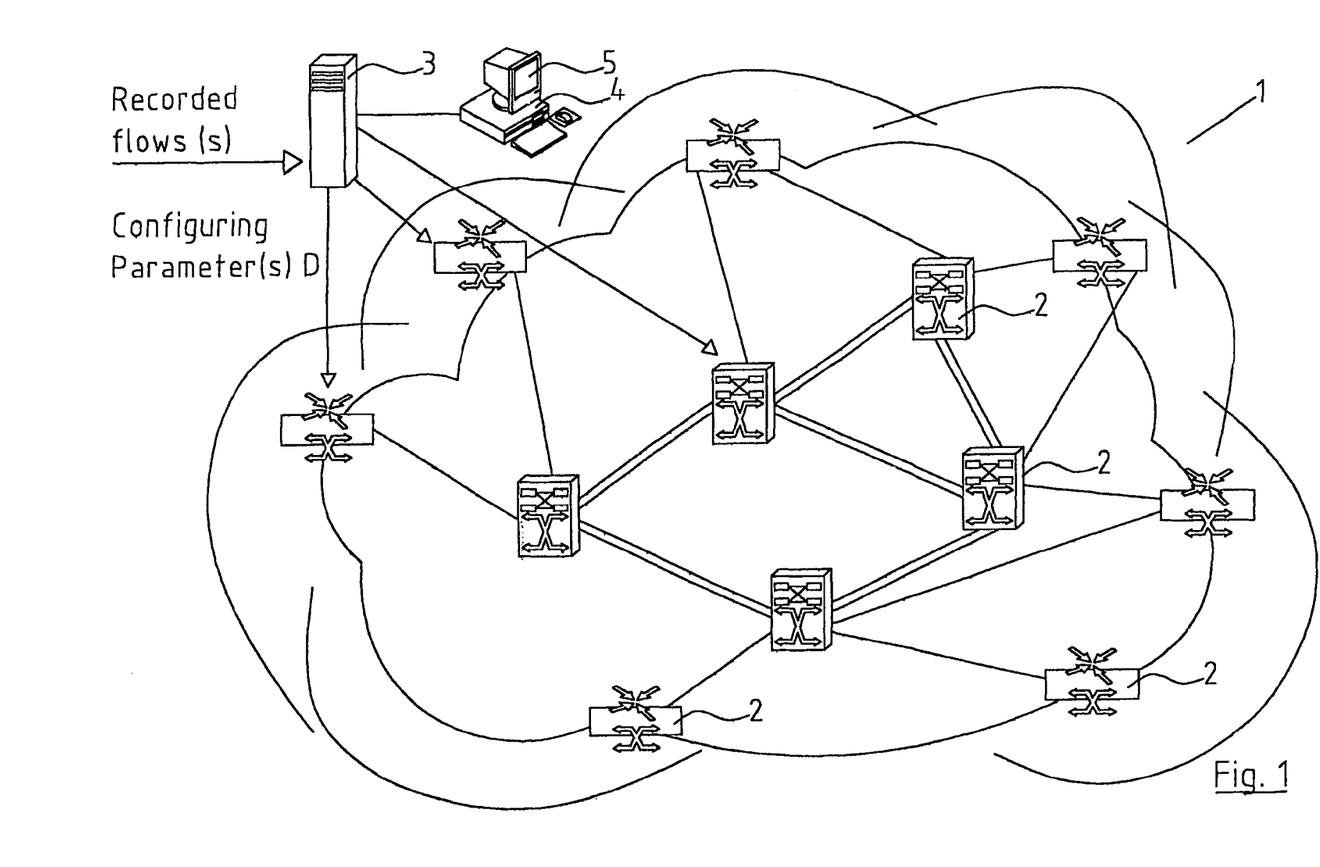
FIG. 1 is a physical representation of how the invention is carried out.

Referring now to the drawings and initially to FIG. 1, there is provided a communications network, indicated generally by the reference numeral 1 in which a number of switches or routers 2 positioned at each node control traffic flows within the communications network 1. A bandwidth estimation server 3 communicates via the network 1 and is connected to each of the routers 2 within the communications network 1. The bandwidth estimation server 3 can be remote from each router 2. It will be appreciated that the bandwidth estimation server 3 can be housed directly on a router 2 if necessary. A computer 4 is connected to the bandwidth estimation server 3 having a user interface 5 which allows an operator see the amount of bandwidth being used at each router 2 in real time. The bandwidth estimation server 3 stores a database of relationships, which will be discussed in more detail below. The server 3 has the ability to provide the configuration information either by downloading to routers 2 or on a request from a router.

Figure 2:
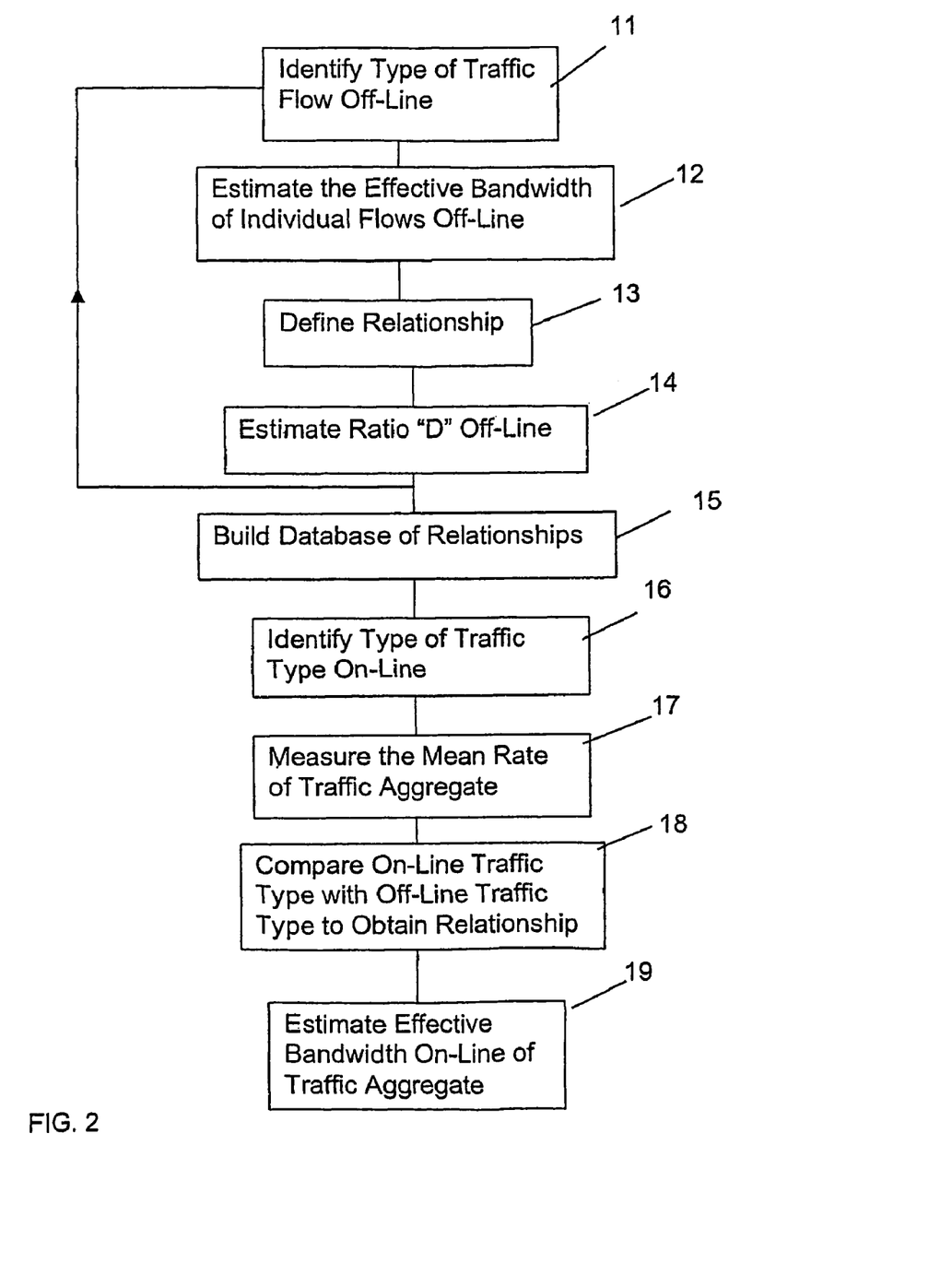
FIG. 2 is a flowchart of the operation of the invention.

Referring now to FIG. 2, there is illustrated a flow diagram of the operation of the invention. In step 11, a type of traffic flow is identified off-line. This may be a recorded traffic flow at a previous time. In step 12, the effective bandwidth and a mean rate of traffic flow of the identified type of traffic flow is estimated off-line. The mean rate is estimated from the measured sample mean and the bandwidth is calculated by using an appropriate methodology. In step 13, the relationship is defined between the effective bandwidth and the mean rate of traffic flow for the identified type of traffic flow. In step 14, a ratio estimate is obtained off-line. Steps 11 to 14 are carried out for a number of different identified traffic flows of the same type or as well as for different identified types of traffic flow if necessary. Each time a relationship is obtained, it is added to a database of relationships in step 15 which stores relationships for different identified types of traffic flow off-line. Steps 11 to 15 can be referred to as the tuning stage of the method.

The tuning stage may be carried out on-line. This tuning stage is, strictly speaking, a preparatory stage and would not necessarily even have to be done by the operator of the network. This data could be previously supplied. In other words, the database of relationships could be supplied with the invention and thus all the operator of the communications network would have to do would be to have available, the particular database of relationships. In practice, ideally the database will be also upgraded during use.

It is very important to appreciate that the database may contain relationships for one particular flow of data, that has one clearly identified and singular flow of data, while another more complex aggregate flow, that is to say, a flow of a traffic containing a number of individual traffic flows, may also be entered into the database.

In step 16, a traffic flow on-line at a node or router 2 is identified. In step 17, the mean rate of the traffic aggregate is estimated from the sample mean. In step 18, the identified on-line traffic type is compared with the database of relationships. A relationship is obtained which represents the closest off-line traffic type with the identified on-line traffic aggregate. In step 19, an estimate of the effective bandwidth on-line of the identified traffic aggregate on-line is obtained from the mean rate of traffic flow of the identified traffic aggregate on-line and the relationship obtained from the same or similar identified type of traffic off-line from the database of relationships.

Referring now in detail to the idea of the method, suppose that the total mean rate of a traffic flow or group of traffic flows is measured and is equal to m. Then the effective bandwidth requirement is estimated to be equal to D×m, where D is some constant coefficient that has been estimated during the tuning stage of the method.

It is possible to estimate the effective bandwidth requirement by measuring only mean rate m of the traffic flow. It should be emphasised that the coefficient D is always known as it is defined during the tuning stage which will be discussed later. In general, it is useful to think about D as a "typical ratio" of effective bandwidth requirement with respect to the mean rate of traffic flow or traffic aggregates (i.e. group of related flows).

The basic idea of the method can be illustrated as follows. A parameter D is estimated in the following way. Suppose that there is provided a collection of N recorded flows with measured mean bit rates $m_i, \ldots, m_N$, respectively. Each traffic flow has a flow duration denoted by $T_i, \ldots, T_N$, respectively. An algorithm is used off-line to estimate effective bandwidths of flows. $E_i, \ldots, E_N$ are the corresponding effective bandwidths requirements of each particular flow. It is implicitly assumed that quality of service requirements such as loss ratio and delay as well as other parameters such as link bandwidth and buffer size are used for the estimation of $E_1, \ldots, E_N$. The estimation of a typical ratio of the effective bandwidth requirement with respect to mean rate for a traffic flow. In principle, there are a few ways to do this, depending on which parameters are important.

Put $$C_i = E_i/m_i, i=1, \ldots, N.$$

Where $C_i$=typical ratio for the i-th flow
$E_i$=effective bandwidth requirement of the i-th flow
$m_i$=mean rate of the i-th flow Then C for a traffic flow or number of traffic flows can be estimated as $$C=(C_i+ \ldots +C_N)/N. \quad (1)$$

The method simply puts D=C. With a flow or a traffic aggregate with mean rate m, it is possible to interpret D×m as the estimation of the effective bandwidth requirement for the flow or a traffic aggregate on-line. For one flow or a traffic aggregate comprising a small number of flows, such estimation is not very accurate but for a traffic aggregate comprising many flows, the estimation is accurate. This case is the most simple one as we do not know how long is or will be the duration of traffic flow. The value of D can be used to relate the mean and the effective bandwidth requirement of a large number of flows. This gives the possibility to express flow bandwidth requirements on-line in a very simple way, i.e. D×m, where D is some constant coefficient that has been estimated during the tuning stage of the method and m is the mean rate measured on-line of the traffic flow. The value of D is obtained from the database of relationships of off-line recorded traffic flows. The value D that is used is the closest compared traffic flow off-line to that of the on-line traffic flow. This is the basic idea of the invention.

The expression (1) for "typical ratio" does not take into account flow duration, absolute value of mean flow rate but only the relative relationships of effective bandwidth and mean flow rate. The absolute values of mean flow rates and effective bandwidth requirements can also be useful in bandwidth estimation. The described statistical procedure above can be too simplistic in real network settings. The following formula can be more accurate for the estimation of C in practice:

$$C=(T_iC_i+ \ldots +T_NC_N)/(T_i+ \ldots +T_N). \quad (2)$$

$$C=(T_iE_i+ \ldots +T_NE_N)/(T_im_i+ \ldots +T_Nm_N). \quad (3)$$

Formulae (1), (2) and (3) reflect different approaches to how to construct a sampling process. The use of the formula depends on the problem and the availability of the information for the estimation of C such as flow durations $T_1, \ldots, T_N$. Usually the more parameters that are available for the calculation of the typical ratio the more accurate the bandwidth requirement estimation will be. The accuracy of the effective bandwidth requirement estimation can be influenced by different factors. For example, it has been found in particular that the estimation of effective bandwidth requirement for individual flow has to be robust. Also the flows should have the same, or at least, have close enough quality of service requirements.

In experiments, it has been found that the effective bandwidth requirement estimation produces some errors for the actual values of effective bandwidth requirement of individual flows. For some flows, the estimated value will be less than the actual one and, for others, more. What is important is that the total bandwidth requirement for the aggregate flow be exactly the same in both cases, based on the estimation of effective bandwidth of individual flows or by the above described method.

The actual estimation of C can be carried out in a few different ways. For this, it is required to estimate the mean flow rate, the effective bandwidth requirement and time duration of a number of typical flows. The following are ways to do this:

1. Off-line estimation for "typical" recorded sources;
2. On-line selective estimation for some sources;

3. On-line estimation for all or almost all sources during some time period.

Note that the third variant does not assume constant measurements of effective bandwidth requirement. The third variant gives better approximation for typical ratios but can have similar disadvantages as on-line implementation of the effective bandwidth requirement. The first variant is the most simple for the implementation, but is less accurate then the others.

It will be appreciated that what has been described is a simple model to carry out the method. We now consider more advanced mathematical models of the method to estimate the effective bandwidth requirement. In the models, quality of service parameters are taken into account by using large deviation theory to estimate the parameter D or C.

A few models are described below. The models include the so-called homogeneous case model and models 1, 2 and 3. Homogeneous case model is a specific one designed to deal with the case when mean rate is the same for all traffic flows. This model can be easily adopted to be practically implemented in a communications network. The other three models 1, 2 and 3 are generic and more complex. Model 1 is a generalization of the homogeneous case. Models 1, 2 and 3 are different in terms of accuracy of the estimation of the effective bandwidth as well as in the implementation of complexity. It should be noted that when implementing the proposed method, it is required to find proper tradeoffs between the required accuracy and the implementation complexity at each node or router 2 in the communications network 1.

Homogeneous Case Model

The above method is accurate when ratios $C_i$ of effective bandwidth requirements to mean rates would be the same for all i flows or close enough to mean typical ratio C. Obviously, when the variance of ratios $C_i$ increases, the uncertainty about the resource required by each flow also increases. As a result, the communications network has to allocate more resource for each flow in order to meet the quality of service requirements. It is important to take this factor into account. Suppose that flows share a link of bandwidth B. Suppose that all flows have the same (constant) mean rates m, but all $C_i$ are random and have the same distribution function F. Distribution function F is estimated as empirical distribution function for $C_i, \ldots C_N$. Also, suppose that all flows have loss ratio equal to p. it is important to find the maximum number of traffic flows that can be admitted to the router 2 while ensuring quality of service requirements are met, which flows are represented by "n".

The resource will depend on how many traffic flows the network could carry out while still meeting the quality of service requirements. In statistical terms, this condition can be expressed as follows. It is necessary to find the maximum value n such that:

$$\text{Prob}\{mC_i + \ldots + mC_n > B\} < p. \quad (5)$$

In other words, it is necessary to find the maximum value n such that the saturation probability, that the total resource $m \times (C_1 + \ldots + C_n)$ that is required by all flows is greater than B bandwidth requirement to maintain quality of service requirements, is less than cell loss ratio p. When the maximum number n of flows is known, then the value of D can be estimated as:

$$D = B/(m\,n).$$

It is possible to obtain n by some approximation methods, for example, based on large deviation theory.

Model 1

Model 1 is a direct generalisation of the homogeneous case. In this case, we take m equal to average mean flow rate estimated from different samples:

$$m = (m_i + \ldots + m_N)/N.$$

The rest of the calculations are the same as in the homogenous method.

Model 2

Again, it is assumed here that the flows share a link of bandwidth B. But suppose that flows can belong to one of the following types: each flow of the j-th type has estimated mean rate $m^{(j)}$. Note that it is not assumed here that the mean rates of flows are constant. The ratio of effective bandwidth with respect to mean rate $C_{j,i}$ for the i-th flow of type j is a random variable with some distribution function $F^{(j)}$, j= 1, . . . , J, depending on type of flow. Suppose also that all flows have cell loss ratio equal to p.

The problem of finding $n_j$ can be done in a similar way as in the homogeneous case dealing with each class j separately in order to find $D_j$.

The values of $D_j$ can be used separately if aggregate measurements for each traffic flow are available. But in the case when such measurements are not available then it could be possible to estimate value of $p_j$ presenting the fraction of traffic class j, then typical ratio D for all classes is equal to $$D = p_i D_i + \ldots + p_j D_j$$

Model 3

The previous model can be generalised even further. Assume that flows share a link of bandwidth B. Assume that random vector $(m_i, c_i)$ associated with each flow has a distribution function $F(.\,,\,.)$, where $m_i$ and $E_i = m_i \times C_i$ are mean rate and effective bandwidth of the flow, respectively. It is assumed that effective bandwidth is calculated according to some specified cell loss ratio p or delay d. This model is a bit more complicated but still can be treated in similar way as Model 2.

It will be appreciated that the method is based on the observation that the ratio of effective bandwidth requirement with respect to the mean rate does not vary. Tuning of the method parameters can be formed off-line using recorded traffic flows or on-line using real time traffic flows. The actual usage of the method is very simple. It relies on the measurement of mean rate of traffic flow or traffic aggregates. The effective bandwidth requirement of traffic aggregate is simply proportional to the mean rate D×m where m is measured mean rate of traffic and coefficient D is estimated during the tuning phase of the method. Steps 11 to 15 are the tuning phase of the method, as described above.

It will be appreciated that the invention works equally well for a single traffic flow or a group of traffic flows or traffic aggregates. It will also be appreciated that after an on-line estimation of bandwidth requirement, the database of relationships can be updated with the estimated values.

It has been found to improve the accuracy of the estimation of effective bandwidth off-line, the mean rate of traffic flow is calculated over a number of time intervals. It will be appreciated that in this specification, when we are discussing measuring the mean rate of traffic flow, it corresponds to the measured number of packets of information at the node or router on-line.

It will be further appreciated that a network operator controlling the communications network can see from the user interface 5, the bandwidth requirements and the number of traffic flows going through each router 2 in the network.

If the number of traffic flows going through the router 2 is too large, the invention estimates the bandwidth in real time so that the operator can see at a glance that too much traffic is being directed through that router. An admission control unit located within the bandwidth estimation server 3 can take action by allocating more bandwidth to that router 2 or rejecting some of the calls going through by re-routing the calls via another source.

It will be appreciated that, strictly speaking, one cannot allocate more bandwidth to a router, in the sense that the total bandwidth available, namely, the service capacity of the router, is fixed, but one can ensure that particular streams of traffic reaching that router have either more available buffer capacity and thus effectively, more router capacity. Therefore, what is allocated is more of the capacity of the router or switch to that particular traffic flow. One of the obvious and logical ways of doing this will be, for example, to reduce the bandwidth available to elastic traffic, that is to say, traffic flows that adapt to time-varying available bandwidth over a communications link using a feedback control scheme.

Typical examples of elastic traffic applications are the transfer of files supporting email or the transfer of files over the World-Wide Web. Thus, call admission control is achieved in real time without any loss of quality in the communications network.

It will be further appreciated that the mathematical models described in this specification are just some techniques and it is envisaged that other models may be used using the same parameters to estimate the effective bandwidth by obtaining the typical ratio.

It will be appreciated that the traffic aggregate is an aggregation of traffic flows going via a node, namely, a switch or a router. In general, the traffic aggregate can be defined via a filter that "selects" packets based on the content of packet headers or other packet data, and/or on implicit or derived attributes associated with the packet. The filter is a set of conditions on the components of a packet's classification key. A filter is said to match only if each condition is satisfied. Some examples of traffic aggregates are traffic that goes via a link in one direction, traffic of the same class that goes via a link in one direction (DiffServ), traffic of the same label switched path or the same forwarding equivalence class that goes via a link in one direction (MPLS), traffic with the same destination address or group of addresses, traffic of the same source and destination addresses, and traffic of the same application or port number.

It will be appreciated that various aspects of the invention may be embodied on the computer 4 that is running a program or program segments originating from a computer readable or usable medium, such medium including but not limited to magnetic storage media (e.g. ROMs, floppy disks, hard disks, etc.), optically readable media (e.g. CD-ROMs, DVDs, etc.) and carrier waves (e.g., transmissions over the Internet). A functional program, code and code segments, used to implement the present invention can be derived by a skilled computer programmer from the description of the invention contained herein.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied in both construction and detail.

The invention claimed is:

1. A method of estimating an effective bandwidth requirement of a traffic flow at a node in a communications network with an associated database of relationships, the database having been provided by:
   identifying a type of traffic flow off-line;
   estimating a mean rate of traffic flow of the identified type of traffic flow;
   estimating the effective bandwidth requirement of this flow;
   defining a relationship between the effective bandwidth requirement and the mean rate of traffic flow for this identified type of traffic flow; and
   storing in the database of relationships, the relationship for different identifiable types of traffic flows, and
in which the method comprises:
   (a) sampling a traffic flow on-line at the node;
   (b) identifying the type of traffic flow on-line at the node;
   (c) estimating the mean rate of the traffic flow on-line;
   (d) comparing the identified type of the traffic flow on-line to a similar identified type of traffic flow off-line to obtain a relationship from the database of relationships; and
   (e) estimating an effective bandwidth requirement of the traffic flow on-line at the node from the estimated mean rate of the traffic flow and the relationship obtained from the database of relationships.

2. A method of estimating the effective bandwidth requirement at a node in a communications network according to claim 1, in which the traffic flow is a traffic aggregate of a group of traffic flows and the traffic aggregate is dealt with as if it were the one cohesive traffic flow.

3. A method of estimating the effective bandwidth requirement at a node according to claim 1, in which the method further comprises the step of:
   identifying a traffic aggregate on-line which represents traffic produced by a group of flows;
   identifying each flow of traffic forming the traffic aggregate;
   estimating the mean rate of traffic flow individually on-line for the number of identifiable types of traffic flows forming the traffic aggregate;
   individually comparing each type of identified traffic flow on-line to a similar type of traffic flow off-line to obtain a relationship from the database of relationships for each type of identified traffic flow on-line; and
   estimating the effective bandwidth requirement for the number of identifiable types of traffic flow forming the traffic aggregate to provide the effective bandwidth requirement of the traffic aggregate at the node.

4. A method of estimating the effective bandwidth requirement according to claim 1 wherein the method further comprises the step of:
   updating the database of relationships with a relationship from the estimated effective bandwidth requirement and the mean flow rate of the traffic flow on-line.

5. A method of estimating the effective bandwidth requirement according to claim 1 in which the step of obtaining the effective bandwidth requirement off-line takes account of quality of service requirements in the communications network.

6. A method of estimating the effective bandwidth requirement according to claim 1 in which the steps of obtaining the effective bandwidth requirement off-line incorporates one of a loss ratio and delay parameter in the communications network.

7. A method of estimating the effective bandwidth requirement according to claim 1, in which the step of calculating the relationship between the effective bandwidth requirement and the mean rate of traffic flow is calculated off-line over a number of time intervals.

8. A method of estimating the effective bandwidth requirement according to claim 1, wherein the step of measuring the mean rate of traffic flow comprises measuring the number of packets of information at the node on-line.

9. A method of estimating the effective bandwidth requirement according to claim 1, wherein the relationship between the effective bandwidth requirement and the mean rate of traffic flow is calculated as the ratio of the effective bandwidth requirement with respect to the mean rate of the traffic flow.

10. A method of estimating the effective bandwidth requirement according to claim 1, comprising estimating the effective bandwidth requirement off-line and estimating the mean rate off-line of a sample of the traffic for a number of traffic flows to obtain a relationship represented by:

$$C_i = \frac{E_i}{m_i}, \quad i = 1 \ldots N$$

and in which $$C = (C_i + \ldots + C_N)/N$$

where
- $C_i$ = ratio for the i-th flow,
- $E_i$ = Effective bandwidth requirement the for i-th flow measured off-line,
- $m_i$ = Mean rate of traffic flow for the i-th flow measured off-line,
- N = Number of different traffic flows, and
- C = ratio for the N flows.

11. A method of estimating the effective bandwidth requirement according to claim 1, comprising estimating the effective bandwidth requirement off-line and estimating the mean rate off-line of a sample of the traffic for a number of traffic flows to obtain a relationship represented by:

$$Ci = \frac{E_i}{m_i}, \quad i = 1 \ldots N$$

and in which $$C = (T_i C_i + \ldots + T_N C_N)/(T_i + \ldots + T_N)$$

where
- $C_i$ = ratio for the i-th flow,
- $E_i$ = Effective bandwidth requirement the for i-th flow measured off-line,
- $m_i$ = Mean rate of traffic flow for the i-th flow measured off-line,
- N = Number of different traffic flows,
- $T_i$ = time duration of a particular flow, and
- N = total number of flows.

12. A method of estimating the effective bandwidth requirement according to claim 1, comprising estimating the effective bandwidth requirement off-line and estimating the mean rate off-line of a sample of the traffic for a number of traffic flows to obtain a relationship represented by:

$$C_i = \frac{E_i}{m_i}, \quad i = 1 \ldots N$$

and in which $$C = (T_i E_i + \ldots + T_N E_N)/(T_i m_i + \ldots + T_N m_N)$$

where
- $C_i$ = ratio for the i-th flow,
- $E_i$ = Effective bandwidth requirement the for i-th flow measured off-line,
- $m_i$ = Mean rate of traffic flow for the i-th flow measured off-line,
- N = Number of different traffic flows,
- $T_i$ = time duration of a traffic flow,
- $E_i$ = estimated effective bandwidth requirement of a traffic flow,
- $m_i$ = measured mean rate of a traffic flow, and
- C = ratio for N traffic flows.

13. A method of estimating the effective bandwidth requirement according to claim 1, comprising the further step of:
factoring the quality of service requirements into the estimation of bandwidth requirement by calculating the maximum number of flows to maintain quality of service requirements by:

$$\text{Prob}\{mC_1 + \ldots + mC_N > B\} < P$$

wherein
- m = measured mean rate of traffic flow,
- C = typical ratio for one traffic flow,
- B = bandwidth requirement to maintain quality of service,
- P = loss ratio, and
- N = Number of traffic flows.

14. A method of estimating the effective bandwidth requirement according to claim 1, comprising the further step of:
factoring the quality of service requirements into the estimation of bandwidth requirement by calculating the maximum number of flows to maintain quality of service requirements by:

$$\text{Prob}\{mC_1 + \ldots + mC_N > B) < P$$

wherein
- m = measured mean rate of traffic flow
- C = typical ratio for one traffic flow
- B = bandwidth requirement to maintain quality of service
- P = loss ratio
- N = Number of traffic flows and in which the effective bandwidth requirement is obtained by estimating a ratio D off-line for a number of traffic flows represented by:

$$D = \frac{B}{mn}$$

where
- B = bandwidth requirement to maintain quality of service
- m = mean rate
- n = maximum number of flows allowed at the node.

15. A method of estimating the effective bandwidth requirement according to claim 1, in which some or all of steps (b) to (e) are carried out outside the jurisdiction.

16. A method of estimating the effective bandwidth requirement according to claim 1, in which one or more of steps (a), (b) and (c) are carried out outside the jurisdiction.

17. A method of estimating an effective bandwidth requirement of a traffic flow at a node in a communications network with an associated database of relationships, the database having been provided by:
   identifying a type of aggregate traffic flow comprising a plurality of 15 individual traffic flows off-line;
   estimating a mean rate of traffic flow of the identified type of aggregate traffic flow;
   estimating the effective bandwidth requirement of this flow;
   defining a relationship between the effective bandwidth requirement and the mean rate of traffic flow for this identified type of aggregate traffic flow; and
   storing in the database of relationships, the relationship for different identifiable types of aggregate traffic flows, and
in which the method comprises:
   (a) sampling an aggregate traffic flow on-line;
   (b) identifying the type of the aggregate traffic flow on-line at the node;
   (c) measuring the mean rate of the aggregate traffic flow on-line;
   (d) comparing the identified type of the aggregate traffic flow on-line to a similar identified type of aggregate traffic flow off-line to obtain a relationship from the database of relationships; and
   (e) estimating an effective bandwidth requirement of the aggregate traffic flow on-line at the node from the estimated mean rate of the traffic flow and the relationship obtained from the database of relationships.

18. A method of estimating the effective bandwidth requirement at a node according to claim 17, in which the method further comprises the step of:
   identifying a traffic aggregate on-line which represents traffic produced by a group of traffic aggregates;
   identifying each flow of traffic forming one of the traffic aggregates;
   estimating the mean rate of aggregate traffic flow individually on-line for the number of identifiable types of a traffic flows forming the traffic aggregate;
   individually comparing each type of identified aggregate traffic flow on-line to a similar type of traffic flow off-line to obtain a relationship from the database of relationships for each type of identified aggregate traffic flow on-line; and
   estimating the effective bandwidth requirement on-line at the node for the number of identifiable types of traffic flow forming the traffic aggregate to provide the effective bandwidth requirement of the traffic aggregate.

19. A method of estimating the effective bandwidth requirement according to claim 17, wherein the method further comprises the step of:
   updating the database of relationships with a relationship from the estimated effective bandwidth requirement and the mean rate on-line value.

20. A method of estimating the effective bandwidth requirement according to claim 17, in which the step of calculating the relationship between the effective bandwidth requirement and the mean rate of aggregate traffic flow is calculated off-line over a number of time intervals.

21. A method of estimating the effective bandwidth requirement according to claim 17, wherein the step of measuring the mean rate of aggregate traffic flow comprises measuring the number of packets of information at the node on-line.

22. A method of estimating the effective bandwidth requirement according to claim 17, wherein the relationship between the effective bandwidth requirement and the mean rate of aggregate traffic flow is calculated as the ratio of the effective bandwidth requirement with respect to the mean rate of the aggregate traffic flow.

23. A method of estimating the effective bandwidth requirement according to claim 17, comprising estimating the effective bandwidth requirement off-line and estimating the mean rate off-line of a sample of the aggregate traffic for a number of aggregate traffic flows to obtain a relationship represented by:

$$C_i = \frac{E_i}{m_i} \qquad i = 1 \ldots N$$

and in which $$C = (C_1 + \ldots + C_N)/N$$

where
   $C_i$=ratio for the i-th flow,
   $E_i$=Effective bandwidth requirement the for i-th flow measured off-line,
   $m_i$=Mean rate of aggregate traffic flow for the i-th flow measured off-line,
   N=Number of different aggregate traffic flows, and
   C=ratio for the N flows.

24. A method of estimating the effective bandwidth requirement according to claim 17, comprising estimating the effective bandwidth requirement off-line and estimating the mean rate off-line of a sample of the aggregate traffic for a number of aggregate traffic flows to obtain a relationship represented by:

$$C_i = \frac{E_i}{m_i} \qquad i = 1 \ldots N$$

and in which $$C = (T_1 C_1 + \ldots + T_N C_N)/(T_1 + \ldots + T_N)$$

where
   $C_i$=ratio for the i-th flow,
   $E_i$=Effective bandwidth requirement the for i-th flow measured off-line,
   $m_i$=Mean rate of aggregate traffic flow for the i-th flow measured off-line,
   N=Number of different aggregate traffic flows,
   $T_i$=time duration of a particular flow, and
   N=total number of flows.

25. A method of estimating the effective bandwidth requirement according to claim 17, comprising estimating the effective bandwidth requirement off-line and estimating the mean rate off-line of a sample of the aggregate traffic for a number of aggregate traffic flows to obtain a relationship represented by:

$$C_i = \frac{E_i}{m_i} \qquad i = 1 \ldots N$$

and in which $$C=(T_1E_1+ \ldots +T_NE_N)/(T_1m_1+ \ldots +T_Nm_N)$$

where
$C_i$=ratio for the i-th flow,
$E_i$=Effective bandwidth requirement the for i-th flow measured off-line,
$m_i$=Mean rate of aggregate traffic flow for the i-th flow measured off-line,
N=Number of different aggregate traffic flows,
$T_i$=time duration of a aggregate traffic flow,
$E_i$=estimated effective bandwidth requirement of a aggregate traffic flow,
$m_i$=measured mean rate of a aggregate traffic flow, and
C=ratio for N aggregate traffic flows.

26. A method of estimating the effective bandwidth requirement according to claim 17, comprising the further step of:
factoring the quality of service requirements into the estimation of bandwidth requirement by calculating the maximum number of flows to maintain quality of service requirements by:

$$\text{Prob}\{mC_1+ \ldots +mC_N>B\}<P$$

wherein
m=measured mean rate of aggregate traffic flow,
C=typical ratio for one aggregate traffic flow,
B=bandwidth requirement to maintain quality of service,
P=loss ratio, and
N=Number of aggregate traffic flows.

27. A method of estimating the effective bandwidth requirement according to claim 17, comprising the further step of:
factoring the quality of service requirements into the estimation of bandwidth requirement by calculating the maximum number of flows to maintain quality of service requirements by:

$$\text{Prob}\{mC_1+ \ldots +mC_N>B\}<P$$

wherein
m=measured mean rate of aggregate traffic flow
C=typical ratio for one aggregate traffic flow
B=bandwidth requirement to maintain quality of service
P=loss ratio
N=Number of aggregate traffic flows
and in which the effective bandwidth requirement is obtained by estimating a ratio D off-line for a number of aggregate traffic flows represented by:

$$D = \frac{B}{mn}$$

where
B=bandwidth requirement to maintain quality of service
m=mean rate
n=maximum number of flows allowed at the node.

28. A method of estimating the effective bandwidth requirement according to claim 17, in which some or all of steps (b) to (e) are carried out outside the jurisdiction.

29. A method of estimating the effective bandwidth requirement according to claim 17, in which one or more of steps (a), (b) and (c) are carried out outside the jurisdiction.

30. A method of estimating an effective bandwidth requirement of a traffic flow at a node in a communications network comprising:
identifying a type of traffic flow off-line;
estimating the effective bandwidth requirement and a mean rate of traffic flow of the identified type of traffic flow;
defining a relationship between the effective bandwidth requirement and the mean rate of traffic flow for the identified type of traffic flow;
storing in a database of relationships, the relationship for different identifiable types of traffic flows off-line;
identifying the type of a traffic flow on-line at the node;
measuring the mean rate of the traffic flow on-line;
comparing the identified type of the traffic flow on-line to a similar identified type of traffic flow off-line to obtain a relationship from the database of relationships; and
estimating an effective bandwidth requirement of the identified type of traffic flow on-line at the node from the mean rate of the traffic flow measured on-line and the relationship obtained from the database of relationships for the similar identified type of traffic flow off-line.

31. A method of estimating the effective bandwidth requirement at a node in a communications network according to claim 30, in which the traffic flow is a traffic aggregate of a group of traffic flows and the traffic aggregate is dealt with as if it were the one cohesive traffic flow.

32. A method of estimating the effective bandwidth requirement at a node according to claim 30, in which the method further comprises the step of:
identifying a traffic aggregate on-line which represents traffic produced by a group of flows;
identifying each flow of traffic forming the traffic aggregate;
estimating the mean rate of traffic flow individually on-line for the number of identifiable types of traffic flows forming the traffic aggregate;
individually comparing each type of identified traffic flow on-line to a similar type of traffic flow off-line to obtain a relationship from the database of relationships for each type of identified traffic flow on-line; and
estimating the effective bandwidth requirement on-line at the node for the number of identifiable types of traffic flow forming the traffic aggregate to provide the effective bandwidth requirement of the traffic aggregate.

33. A method of estimating the effective bandwidth requirement according to claim 30, wherein the method further comprises the step of:
updating the database of relationships with a relationship from the estimated effective bandwidth requirement and the mean rate on-line value.

34. A method of estimating the effective bandwidth requirement according to claim 30, wherein the step of measuring the mean rate of traffic flow comprises measuring the number of packets of information at the node on-line.

35. A method of estimating the effective bandwidth requirement according to claim 30, wherein the relationship between the effective bandwidth requirement and the mean rate of traffic flow is calculated as the ratio of the effective bandwidth requirement with respect to the mean rate of the traffic flow.

36. A method of estimating the effective bandwidth requirement according to claim 30, comprising estimating the effective bandwidth requirement off-line and estimating the mean rate off-line of a sample of the traffic for a number of traffic flows to obtain a relationship represented by:

$$C_i = \frac{E_i}{m_i} \quad i = 1 \ldots N$$

and in which $$C = (C_i + \ldots + C_N)/N$$

where
  $C_i$=ratio for the i-th flow,
  $E_i$=Effective bandwidth requirement the for i-th flow measured off-line,
  $m_i$=Mean rate of traffic flow for the i-th flow measured off-line,
  N=Number of different traffic flows, and
  C=ratio for the N flows.

37. A method of estimating the effective bandwidth requirement according to claim 30, comprising estimating the effective bandwidth requirement off-line and estimating the mean rate off-line of a sample of the traffic for a number of traffic flows to obtain a relationship represented by:

$$C_i = \frac{E_i}{m_i} \quad i = 1 \ldots N$$

and in which $$C = (T_i C_i + \ldots + T_N C_N)/(T_i + \ldots + T_N)$$

where
  $C_i$=ratio for the i-th flow,
  $E_i$=Effective bandwidth requirement the for i-th flow measured off-line,
  $m_i$=Mean rate of traffic flow for the i-th flow measured off-line,
  N=Number of different traffic flows,
  $T_i$=time duration of a particular flow, and
  N=total number of flows.

38. A method of estimating the effective bandwidth requirement according to claim 30, comprising estimating the effective bandwidth requirement off-line and estimating the mean rate off-line of a sample of the traffic for a number of traffic flows to obtain a relationship represented by:

$$C_i = \frac{E_i}{m_i} \quad i = 1 \ldots N$$

and in which $$C = (T_i E_i + \ldots + T_N E_N)/(T_i m_i + \ldots + T_N m_N)$$

where
  $C_i$=ratio for the i-th flow,
  $E_i$=Effective bandwidth requirement the for i-th flow measured off-line,
  $m_i$=Mean rate of traffic flow for the i-th flow measured off-line,
  N=Number of different traffic flows,
  $T_i$=time duration of a traffic flow,
  $E_i$=estimated effective bandwidth requirement of a traffic flow,
  $m_i$=measured mean rate of a traffic flow, and
  C=ratio for N traffic flows.

39. A method of estimating the effective bandwidth requirement according to claim 30, comprising the further step of:
  factoring the quality of service requirements into the estimation of bandwidth requirement by calculating the maximum number of flows to maintain quality of service requirements by:

$$\text{Prob}\{mC_1 + \ldots + mC_N > B\} < P$$

wherein
    m=measured mean rate of aggregate traffic flow,
    C=typical ratio for one aggregate traffic flow,
    B=bandwidth requirement to maintain quality of service,
    P=loss ratio, and
    N=Number of aggregate traffic flows.

40. A method of estimating the effective bandwidth requirement according to claim 30, comprising the further step of:
  factoring the quality of service requirements into the estimation of bandwidth requirement by calculating the maximum number of flows to maintain quality of service requirements by:

$$\text{Prob}\{mC_1 + \ldots + mC_N > B\} < P$$

wherein
    m=measured mean rate of aggregate traffic flow
    C=typical ratio for one aggregate traffic flow
    B=bandwidth requirement to maintain quality of service
    P=loss ratio
    N=Number of aggregate traffic flows
  and in which the effective bandwidth requirement is obtained by estimating a ratio D off-line for a number of traffic flows represented by:

$$D = \frac{B}{mn}$$

where
    B=bandwidth requirement to maintain quality of service
    m=mean rate
    n=maximum number of flows allowed at the node.

41. A method of estimating the effective bandwidth requirement according to claim 30, in which some of the steps are carried out outside the jurisdiction.

42. A system for estimating an effectively bandwidth requirement at a node in a communications network comprising:
  (a) at least one computer connected to the node;
  (b) a database of relationships comprising, for a previously sampled traffic flow, an identifier for the traffic flow, an estimate of a mean rate-of flow of said identified traffic flow, and an estimated effective bandwidth requirement for the said identified traffic flows, together with a measure of the relationship between the mean rate of flow and the effective bandwidth requirement;
  (c) means for sampling traffic on-line at the node;

(d) means for allocating an identifier to the traffic on-line at the node;
(e) means for estimating the mean rate of flow of the traffic on-line;
(f) means for comparing the identifier of the traffic on-line with the identifiers in the database;
(g) means for identifying a closest stored identifier in the database with that of the traffic on-line; and
(h) means for extracting an appropriate relationship from the database and estimating the effective bandwidth requirement of the traffic flow on-line.

43. A system according to claim 42, comprising means for dividing the traffic flow into a number of separate traffic flows and for handling each separate traffic flow independently to provide an effective bandwidth requirement for each separate traffic flow.

44. A system according to claim 42, comprising admission control means whereby some of the separate traffic flows, making up the traffic flow on-line at the node, may be rejected at the node if the estimated bandwidth requirement at the node exceeds the bandwidth requirement available at the node for the traffic.

45. A system for estimating the effective bandwidth requirement recited in claim 42, comprising means to measure the mean rate of traffic flow individually on line for a number of identifiable types of traffic flows forming a traffic aggregate.

46. A system for estimating the effective bandwidth requirement as recited in claim 42, comprising means to estimate the effective bandwidth requirement on-line at the node for a number of identifiable types of traffic flow.

47. A system for estimating the effective bandwidth requirement as recited in claim 42, comprising means for updating the database of relationships with a relationship from the estimated effective bandwidth requirement and the estimated mean rate on-line value for future reference.

48. A system for estimating an effectively bandwidth requirement at a node in a communications network comprising:

(a) at least one computer connected to the node;
(b) a database of relationships comprising, for a previously sampled traffic flow, an identifier for the traffic flow, an estimate of the mean rate of said identified traffic flow, and an estimated effective bandwidth requirement for the said identified traffic flows, together with a measure of the relationship between a mean rate of flow and the effective bandwidth requirement;
(c) means for sampling traffic on-line at the node;
(d) means for allocating an identifier to the traffic on-line at the node;
(e) means for estimating the mean rate of flow of the traffic on-line;
(f) means for comparing the identifier of the traffic on-line with the identifiers in the database;
(g) means for identifying a closest stored identifier in the database with that of the traffic on-line; and
(h) means for extracting an appropriate relationship from the database and estimating the effective bandwidth requirement of the traffic flow on-line; and
(i) an admission control unit connected to the node providing means to control the traffic sent to the node.

49. A system according to claim 48, comprising means for dividing the traffic flow into a number of separate traffic flows and for handling each separate traffic flow independently to provide an effective bandwidth requirement for each separate traffic flow.

50. A system for estimating the effective bandwidth requirement as recited in claim 48, comprising means to estimate the effective bandwidth on-line at the node for a number of identifiable types of traffic flow.

51. A system for estimating the effective bandwidth requirement as recited in claim 48, comprising means for updating the database of relationships with a relationship from the estimated effective bandwidth requirement and the estimated mean rate on-line value for future reference.

* * * * *